(12) United States Patent
Burke

(10) Patent No.: US 8,172,437 B2
(45) Date of Patent: *May 8, 2012

(54) LIGHT COUPLED DETACHABLE BOW NAVIGATION LIGHTS FOR BOATS

(76) Inventor: John Burke, Tampa, FL (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/643,816

(22) Filed: Dec. 21, 2009

(65) Prior Publication Data

US 2010/0096991 A1 Apr. 22, 2010

Related U.S. Application Data

(63) Continuation-in-part of application No. 12/174,120, filed on Jul. 16, 2008, now Pat. No. 7,758,219.

(60) Provisional application No. 60/950,650, filed on Jul. 19, 2007.

(51) Int. Cl.
*F21V 1/00* (2006.01)

(52) U.S. Cl. ........................................ 362/477; 362/551

(58) Field of Classification Search .................. 362/477, 362/551, 555, 559, 560, 641, 652, 508, 581; 385/31, 39

See application file for complete search history.

(56) References Cited

U.S. PATENT DOCUMENTS

| | | | | |
|---|---|---|---|---|
| 4,389,085 A * | 6/1983 | Mori | | 359/591 |
| 4,740,870 A * | 4/1988 | Moore et al. | | 362/477 |
| 5,161,874 A * | 11/1992 | Benes | | 362/552 |
| 5,339,225 A * | 8/1994 | Wiggerman | | 362/477 |
| 5,477,424 A * | 12/1995 | Mocha | | 362/555 |
| 6,155,195 A * | 12/2000 | Nirenberg | | 114/343 |
| 6,272,267 B1 * | 8/2001 | Hansler et al. | | 385/43 |
| 6,742,916 B1 * | 6/2004 | Dunn | | 362/477 |
| 7,758,219 B2 * | 7/2010 | Burke | | 362/477 |
| 2007/0274635 A1 * | 11/2007 | Oney | | 385/39 |

* cited by examiner

*Primary Examiner* — Ali Alavi

(57) ABSTRACT

An apparatus that improves the usable life and reliability of detachable bow lights for boats. It replaces electrical energy coupling by light energy coupling, thereby eliminating electrical contact corrosion problems.

27 Claims, 6 Drawing Sheets

LIGHT COUPLED DETACHABLE BOW NAVIGATION LIGHTS FOR BOATS

CROSS-REFERENCE TO RELATED APPLICATIONS

This application is a continuation-in-part of application Ser. No. 12/174,120 filed on Jul. 16, 2008 which claims the benefit of provisional application 60/950,650 filed on 19 Jul. 2007.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to boat bow lights for navigational purposes. Specifically, to detachable bow navigation lights, which allow the lights to be stored out of the way, an advantage for many daytime activities and boat storage. For bow lights, two colors are required. One color of light is visible on the port side of the boat bow and the other color light is visible on the starboard side of the boat bow. The bow lights may be two discrete light sources located on opposing sides of the bow or one two color bifurcated source located near the centerline of the bow.

2. Background Art

Detachable (sometimes called stowable) bow lights typically consist of a base which is mounted to the boat structure and a pole which mechanically couples to the base. The pole has a light emitting device (typically an incandescent bulb) at the distal end. Power to energize the bulb is coupled via electrical contacts at the base and the proximal end of the pole.

Electrical contacts are composed primarily of copper and copper alloys. Although weather covers are typically provided to cover the base electrical contacts, water intrusion almost always occurs. Copper electrical contacts exposed to moisture leads to corrosion and eventual electrical failure of the contacts. The problem is particularly acute in marine environments.

Several US patents describe prior art systems which are related but differ from the invention.

U.S. Pat. No. 4,389,085 to Mori describes a fiber optic system which collects and distributes sunlight.

U.S. Pat. No. 4,740,870 to Moore discloses a central light source which is transmitted to different areas of a boat via fiber optic cabling.

U.S. Pat. No. 5,161,874 to Benes describes a remote illumination system that utilizes a single light source and a light pipe to transmit the light to some remote locations from the source.

U.S. Pat. No. 5,339,225 to Wiggerman is a boat stern light design that illuminates the length of the pole, as opposed to just having a light at the distal end.

U.S. Pat. No. 6,155,195 to Nirenberg discloses a telescoping stern light that can be retracted out of the way when not in use.

U.S. Pat. No. 6,742,916 B1 to Dunn describes a fiber optic cabling system for the sides of boats which is intended illuminate said side for safety or enjoyment purposes.

BRIEF SUMMARY OF THE INVENTION

Previous detachable bow light designs utilize electrical contacts between the base and detachable pole. The contacts connect the electrical power present in the base component to wires within the pole, which in turn transmit the electrical power to a distal end mounted light bulb.

The invention eliminates the electrical contacts corrosion problem of previous designs by transmitting light instead of electrical current across the coupling of the base and light conduit. It further replaces the combined pole and light bulb assembly with a light conduit assembly.

In the broadest form, the invention consists of a boat, a base mounted to or within the boat or boat component, an electrical power connection, an electrical power conditioning device, a single or dual color light source, a detachable light conduit assembly comprising a single or two adjacent light conduits, that mounts to the base, and a mechanism to redirect and emit the transmitted light out of the light conduits.

The boat is any vessel that is required to have or desires to have a bow navigation light. For the purposes of this invention, the term vessel is expanded to include any watercraft.

The base is essentially a boat mounted socket for the pole. The socket provides mechanical mounting and light coupling between the base and light conduit. In various embodiments, the base may have the light source and light driver device incorporated into it or they may be externally mounted to it.

The light source may be formed from a multitude of visible light emitting devices, in one embodiment being a high intensity LED or LEDs.

The electrical power may be from any suitable source which can energize the light source. In one embodiment, the source is the boat's electrical power system. In another, a source independent of the boat's electrical system is used. One, but not the only, example of an independent electrical source is a battery or batteries.

The light driver device circuit can consists of any device capable of converting the incoming electrical power to a form required by the light source. Examples of such devices range from a simple power resistor to switching power topology circuits.

The light conduit may also take a multitude of embodiments. The light conduit in this invention is essentially a large diameter optical fiber or light pipe which efficiently conducts and largely contains light within itself. The radius (or cross sectional area of the light conduit) and length of the light conduit is determined by the particular application. The light conduit may or may not have an external opaque covering.

The light redirection mechanism for the light traveling within the light conduit may also take multiple forms. A fundamental characteristic of the mechanism is reflection and redirection of the conduit light. The horizontal light emission may be comprised of a 180 degree pattern, some lesser subset of 180 degrees or multiple segmented arcs. Multiple segmented arcs means, for the purposes of this invention, multiple geometric arcs where emission is allowed, not allowed or attenuated. The vertical emission pattern is comprised of an angle less than 180 degrees or multiple segmented arcs.

In the following section, one embodiment of the invention is explained in detail. The invention is not intended to be limited in its application to the details of construction and to the arrangements of the components described in the following description or illustrated in the drawings. The invention is capable of other embodiments and of being practiced and carried out in various ways.

The phraseology and terminology employed herein are for the purpose of description and should not be regarded as limiting.

It is the intention of the invention to provide a new detachable navigational bow light system which overcomes the disadvantages of previous systems which is not anticipated, rendered obvious, suggested, or even implied by any of the prior art boat light systems, either alone or in any combination.

BRIEF DESCRIPTION OF THE DRAWINGS

The following drawings illustrate the best modes presently contemplated for carrying out the present invention (Preferred Embodiment).

DETAILED DESCRIPTION OF THE INVENTION

Principle of Operation

Bow navigation lights may be discrete port and starboard or combined port/starboard. The invention provides both configurations. Briefly, the removable light conduits couple the light source(s) contained in the base or bases to an apparatus at the top of each light conduit that disperses the light. Light, for the purposes of this invention, is comprised of any wavelength (color) or wavelengths (colors) in the visible spectrum.

Refer to FIGS. 1, 2, 3, 4 and 5 for the following description.
The Components:

The preferred embodiment consists of two primary components: base 6 mounted to or within the boat structure or component 7 and a removable light conduit assembly 2,19 which plugs into the base light conduit assembly socket 4.

Figure 1:
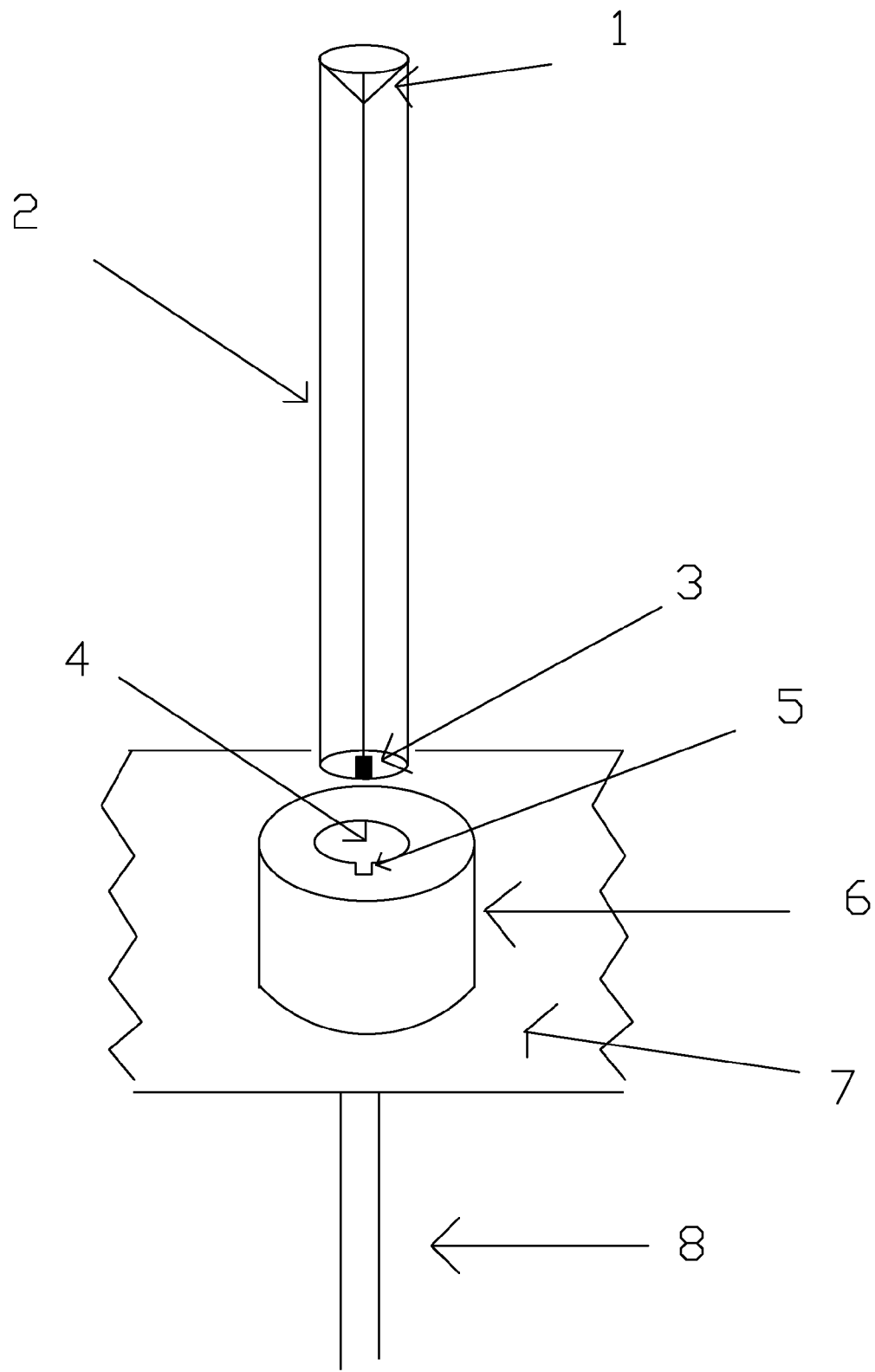
FIG. 1 Perspective component view of the combination port and starboard configuration.
Figure 2:
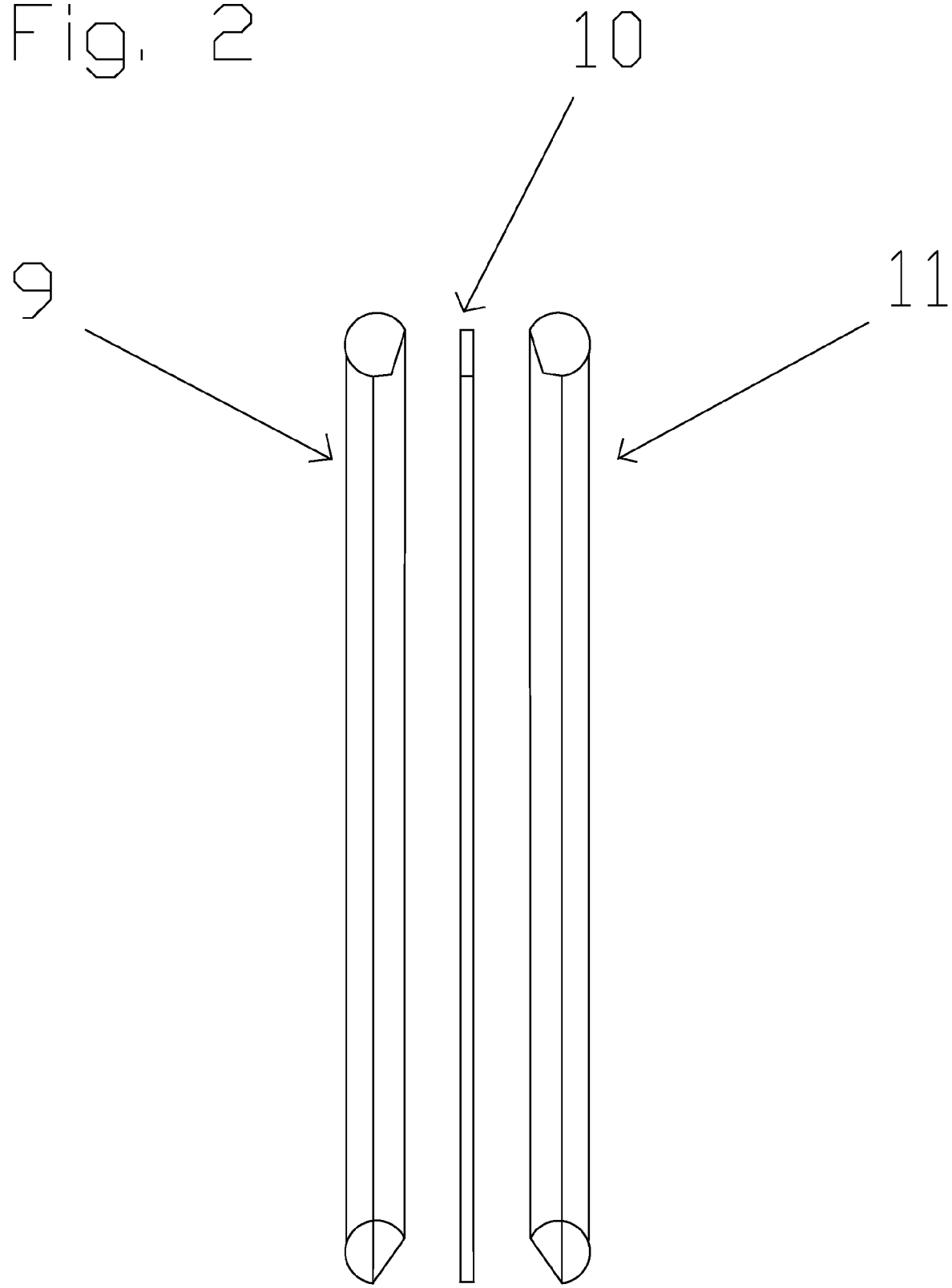
FIG. 2 Exploded perspective view of light conduit component
Figure 4:
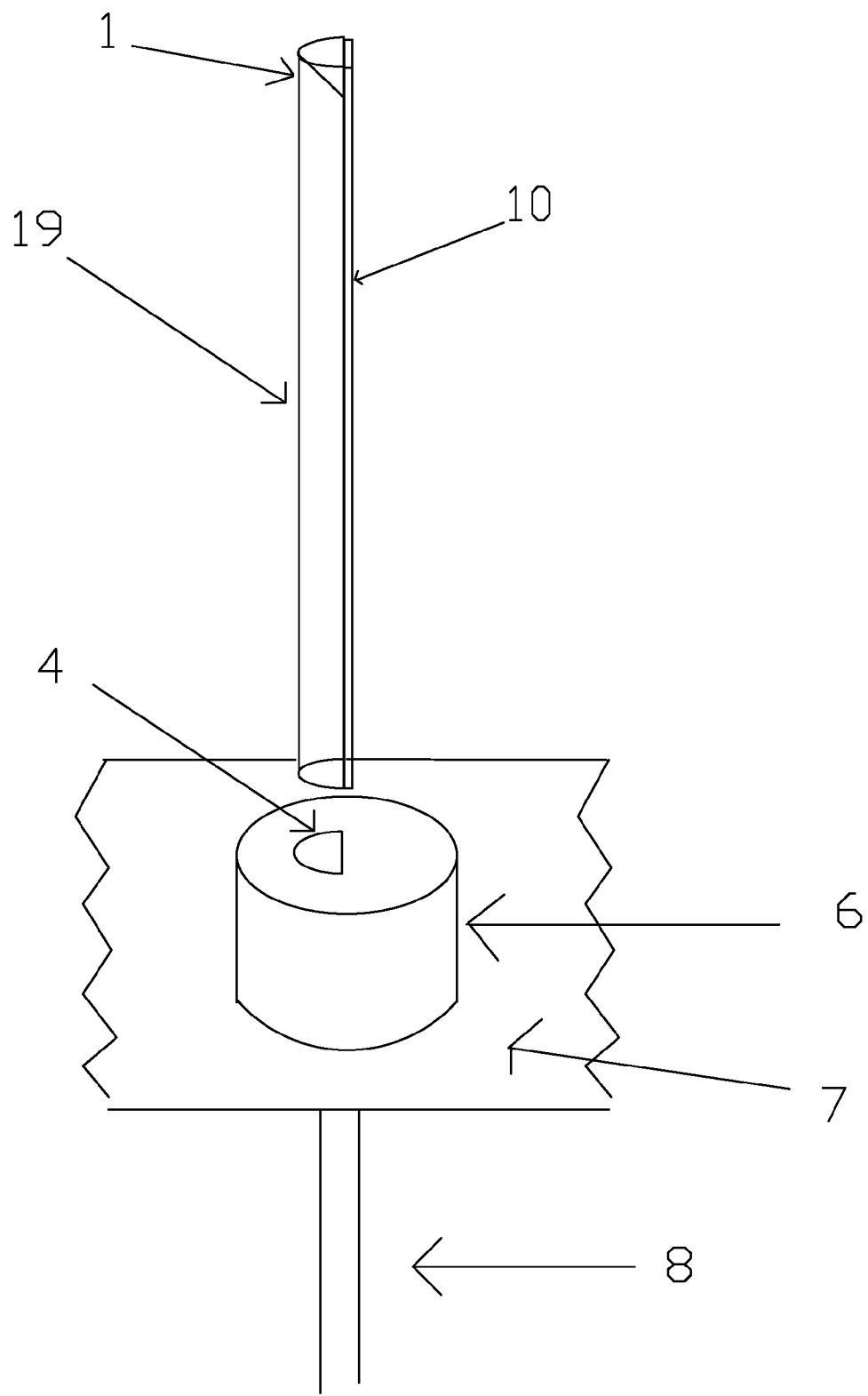
FIG. 4 Perspective component view of the discrete port and starboard configuration.

The light conduit assembly may be configured as a port side light conduit 9 with an optional light barrier 10 FIG. 4, a starboard side light conduit 11 with an optional light barrier 10 FIG. 4 or combination adjoining port 9 and starboard 11 light conduits separated by an optional light barrier 10 FIG. 1. The light barrier 10 is opaque to light and prevents light from being emitted along the adjoining surface with the light conduit. In the case of the combined configuration FIG. 1, a polarizing tab 3, which mates with the corresponding notch 5 in the base 6, at the proximal end of the combined two light conduit assembly 2, aligns the port side light conduit 9 and the starboard side light conduit 11 with the corresponding light sources 17 in the base 6. No separate polarizing is needed in the case of the discrete port and starboard side configuration FIG. 4, as the socket shape determines the light conduit orientation.

In the case of the discrete port and starboard configuration FIG. 4, the light conduit assembly 19 construction each comprises one-half inch radius half-round rod. An optional light barrier 10 may be attached to the flat surface. In the case of the combination port and starboard configuration FIG. 1, the light conduit assembly construction comprises two adjoining one-half inch radius half-round rod light conduits 9,11 with an optional light barrier 10 between them. Alternative construction of the light conduits 9,11 comprises a multitude of geometric shapes including, but not limited to, round rods, square rods, triangular rods and rectangular bars and combinations thereof.

The light conducting material of the preferred embodiment light conduits 9,11 is acrylic. Alternative materials include, but are not limited to glass, polycarbonate or combinations thereof, or any optically transparent material that efficiently conducts light. The cross section size of the light conduit assembly 2,19 is not critical and is primarily determined by the proximal end surface area needed by the light conduits 9 or 11, or the combination 9 and 11 light conduits to efficiently couple their respective light source 17 radiation pattern. Another diameter consideration is structural integrity, larger diameters being sturdier.

The length of the discrete light conduit assembly 19 and combination light conduit assembly 2 is likewise not critical, and can be varied to meet the height requirements of the application. The primary limitation on the length of the light conduit assembly 2,19 is light intensity loss, however that can be offset by higher light sources 17 intensity. The preferred embodiment offers lengths comprised of one to forty-eight inches for the light conduit assembly 2,19. The dimensions chosen for the preferred embodiment of the light conduit assembly 2,19 are not intended to be a limitation in any sense, since the length and diameter of the light conduit assembly 2,19 can be of nearly arbitrary dimensions, as needed by the application.

The optional light barrier 10 construction may be comprised of foil, film, coating, deposition or combinations thereof of light opaque material. Examples of such materials are various metals, including aluminum, steel, copper, opaque plastics, composites or combinations thereof. In the preferred embodiment, 0.002 inch thick aluminum foil is used for the light barrier 10.

The distal end of the light conduit assembly 2,19 has light redirection devices 1 to redirect the light traveling in each of the light conduits 9,11 outward from the light conduits in the desired light emission directional pattern. The redirection devices 1 may be integral to the light conduit 9,11 external to it or a combination thereof. In the case of the integral light redirection devices 1, each redirection device is comprised of an optical discontinuity with an optional additional reflective material at the exterior surface of said optical discontinuity. For the external case, the light redirection devices 1 are comprised of optical discontinuities in the form of reflective surfaces external to the distal end of the light conduits 9, 11. Whether the light redirection occurs integral (internal) to or external to the light conduit, the light redirection function is fundamentally the same.

The light redirection device 1 may consist of any material or combinations of materials that efficiently redirect the light. The integral redirection device is a boundary between materials with differing indexes of refraction and an optional additional reflective surface. More specifically, the light conduit material side of the boundary has a relatively high index of refraction and the other side of the boundary has a relatively low index of refraction. The reflective material used by both the optional additional reflective surface and the external redirection device is comprised of various metal, plastic, composites or combinations thereof that have sufficient light reflection properties. The reflective materials can take the form of films, foils, depositions or combinations thereof.

In the preferred embodiment, each of the light conduits 9,11 have a half-cone shaped optical discontinuity surface integral to the distal end to form the light redirection devices 1. One side of the half-cone surface is comprised of acrylic and the other side is comprised of aluminum, air or combinations thereof, thereby comprising the optical discontinuity. The radius of the half-cone is sized so as to nearly match the radius of the half-round light conduits 9,11, tapering down to a point at the center line of the flat surface of the half-round. There is an additional reflective surface present at the exterior surface of the cone comprised of aluminum foil to enhance light reflection. The half-cone light redirection devices 1 of the light conduits 9, 11 form a cone angle of ninety degrees. Said ninety degree cone angle creates a forty five degree angle of incidence between the cone surface and the impinging light 14, 15. However, the ninety degree cone angle is not intended to limit the possible angles in any way and any angle that redirects the light in the desired pattern is acceptable.

Figure 3:
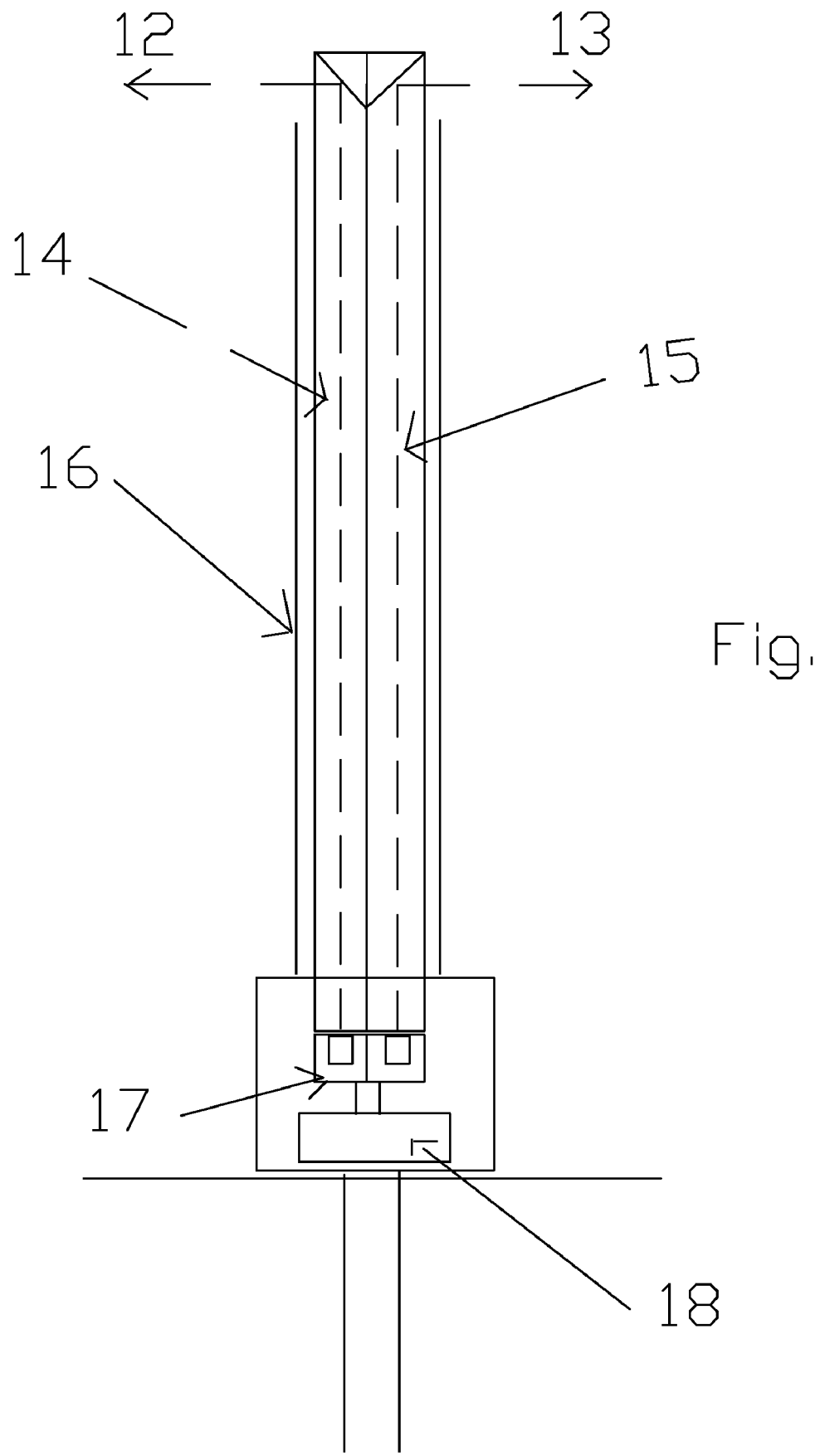
FIG. 3 Cross Section View of the combination port and starboard configuration
Figure 5:
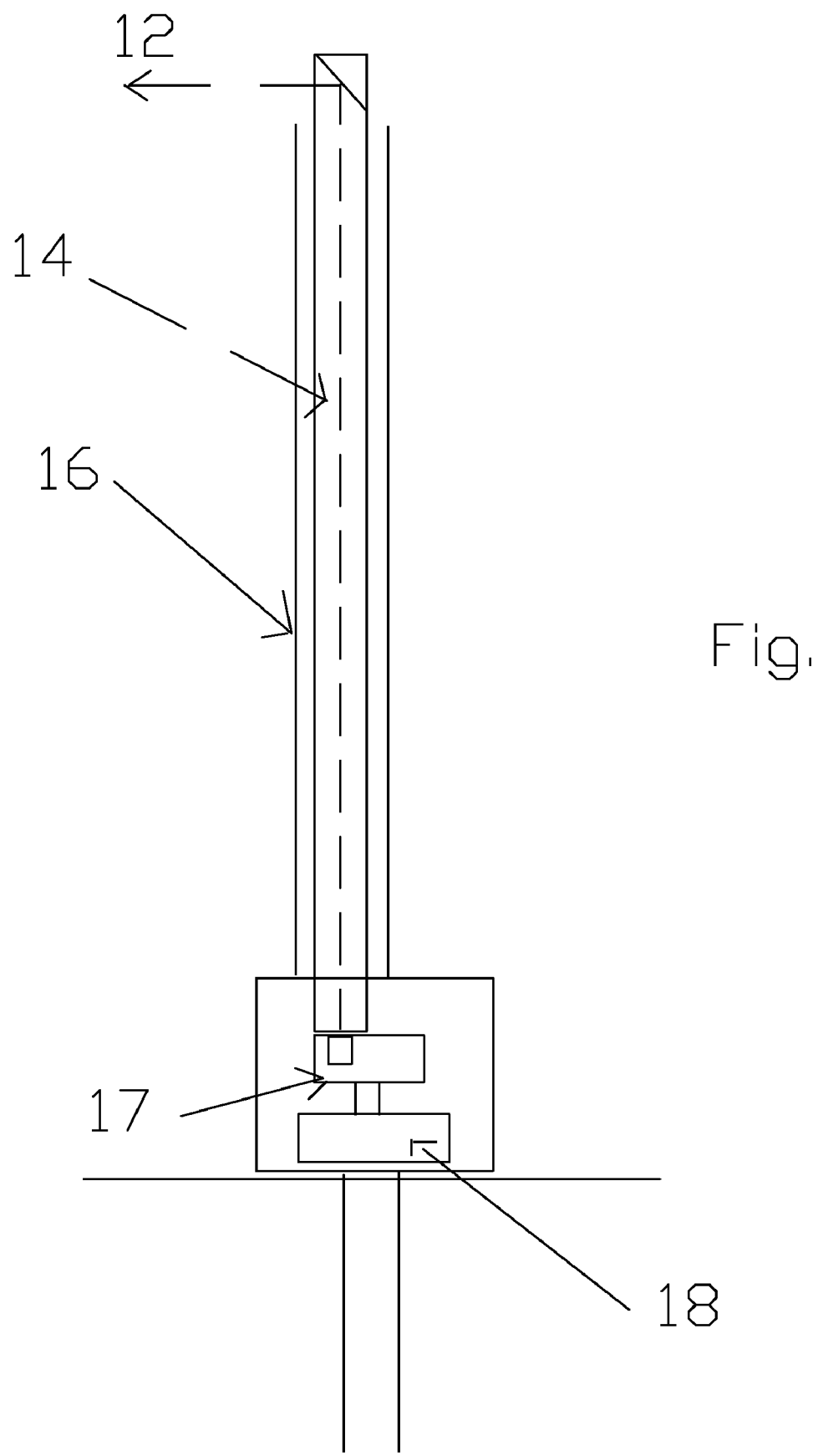
FIG. 5 Cross Section View of the discrete port and starboard configuration

The combination configuration FIG. 3 light conduit assembly 2 and the discrete configuration FIG. 5 light conduit assembly 19 may have an optional opaque outer covering 16. The outer covering 16 may be comprised of any light opaque material suitable for the application, including, but not limited to, aluminum, copper, steel, opaque plastics, opaque coatings or combinations thereof. In the preferred embodiment, an aluminum outer covering 16 is used.

In the case of the discrete port and starboard configuration FIG. 5, the base 6 contains one light source 17: one color light source for the port side base 6 and another color light source for the starboard side base 6. In the case of the combination configuration FIG. 3, the base 6 contains two light sources 17: one color light source for the port side and another color light source for the starboard side. For US waters navigation applications, the light source colors are red and green. The base 6 also contains the light source(s) driver device 18. The light emitted from the light source(s) 17 is directed upward into the light conduit assembly socket 4. The light sources 17 are located at the bottom end of the light conduit assembly socket 4 so as to minimize physical separation between the light sources 17 and the installed light conduit assembly 2,19 proximal end.

In the preferred embodiment, the light conduit assembly socket 4 diameter is such as to provide a slip fit to the light conduit assembly 2,19, thus providing secure attachment of the light conduit assembly 2,19 yet still allowing it to be easily removed. In the case of the combination configuration FIG. 1, a polarizing notch 5 mates with the polarizing tab 3 of the two light conduit assembly 2, ensuring alignment of the two light sources 17 and two corresponding light conduits.

The base 6 may be constructed of any material suitable for the marine environment. Examples include aluminum, stainless steel and a variety of plastics and composites. The preferred embodiment is comprised of aluminum.

Description of Operation

Electrical Section

The base 6, on its lower side, has a connection to an electrical power source comprising wires, terminals, connectors or combinations thereof 8. Said electrical power source is comprised of the boat electrical power system, a source independent of the boat electrical system or combinations thereof. The base 6 also comprises the light sources 17 and the light source driver device 18.

In the preferred embodiment, the light sources 17 are comprised of two different color state-of-the-art high intensity LEDs, available from multiple semiconductor manufacturers. The invention anticipates continuing advancements in LED technology which will provide more light output for less power consumption, hence improving overall efficiency and enabling longer light conduit assembly 2,19 lengths, lower power consumption or combinations thereof. Light sources 17 embodiments comprise LED or LEDs, incandescent bulb or bulbs, florescent bulb or bulbs, LASER or LASERS, or combinations thereof.

The light sources 17 are driven by the light source driver device 18 which conditions the electrical power presented via the electrical connection 8 to the electrical drive requirements of the light sources 17.

Figure 6:
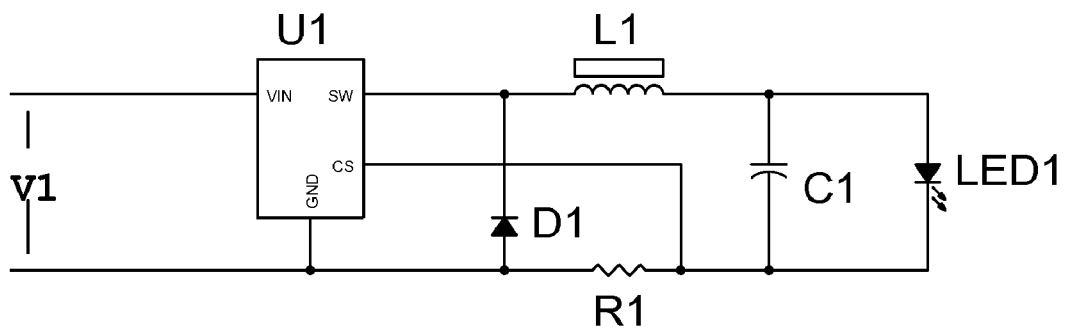
FIG. 6 Switching Power Supply Based Light Source Driver Device

In the preferred embodiment, the LED light source driver device 18 can be comprised of a simple voltage dropping power resistor, a linear power supply topology, a switching power supply design or combinations thereof. For most application the switching power supply design is preferred due to its low power dissipation and accurate LED current control. Those skilled in the art will recognize the light driver circuit depicted in FIG. 6 as an example of a switching power supply based LED driver circuit. FIG. 6 depicts the classical elements: a voltage source V1, a power switch and PWM IC U1, an energy storage section formed by the inductor L1 and capacitor C1, a current sense resistor R1 and a current "catching" diode D1. The light source LED1 is the circuit "load". U1 has pins VIN—the voltage input, SW—power switch output, CS—current sense input and GND—circuit ground. Multiple semiconductor manufactures provide switching power supply based LED driver circuits. The voltage dropping resistor or linear supply is suitable to applications were the input voltage and LED current will not result in excessive power dissipation.

In the preferred embodiment, the LED light sources 17 and the LED light source driver device 18 are thermally conductive epoxy encapsulated within the base to prevent water damage and conduct heat away from the electrical components. There is no inherent need to thermal epoxy encapsulate the light sources 17 and light source driver device 18. Other embodiments are comprised of sealed enclosures, silicone or other gel fillings, dielectric grease or combinations thereof.

Optical Section

The light emerging from the light sources 17 is optically coupled into the light conduits 9,11 of the light conduit assembly 2,19 installed into the base socket 4.

The light 14, 15 coupled into and traveling within the light conduits 9 and 11 respectively, experiences nearly total internal reflection, maximizing optical power transmission to the distal end. The phenomena of total internal reflection is well know to those skilled in the field of fiber optics and relies on the light conduits 9, 11 (core) having a higher index of refraction than the surrounding media, which is comprised of air, an outer covering 16 (cladding) or combinations thereof.

Materials that have good light transmission properties and can be made to provide nearly total internal reflection are candidates for the light conduits 9, 11. Such materials include, but are not limited, acrylic, glass and polycarbonate or combinations thereof. The light conduits 9, 11 in the preferred embodiment are comprised of acrylic, which has excellent light transmission properties and is compatible with marine conditions.

For the preferred embodiment, the aluminum outer covering 16 of the light conduit assembly 2,19 further increases the internal reflection and blocks light from emerging along the periphery of the light conduit assembly 2,19. The aluminum outer covering 16 has an index of refraction lower than that of the light conduits 9, 11 minimizing light loss. The outer covering 16 also provides protection to the light conduit assembly 2,19 from mechanical stress.

The distal end of the preferred embodiment light conduit assembly 2,19 has half-cone shaped light redirection devices 1 in each of the light conduits 9, 11. The light 14, 15 traveling within the light conduits 9, 11 is reflected by the half-cone light redirection devices 1 and is emitted from the light conduits 9, 11. Since the light 14, 15 traveling in each of the light conduits 9, 11 impinges essentially the entire reflective surface of the half-cone light redirection devices 1, the light 12, 13 is emitted in a one hundred eighty degree horizontal pattern around the distal end of each of the light conduits 9, 11. The light redirection devices 1 can be integral to the light conduits 9, 11 (as in the case of the preferred embodiment) or can be external at the distal end of the light conduits 9, 11.

In the case of external light redirection, the light 14, 15 traveling in the light conduits 9, 11 emerges from the light conduit material at the distal ends and continues on to encounter the external light redirection devices 1. It is there that the light 14, 15 is redirected in the same manner as in the integral case.

A horizontal light emission pattern of one hundred eighty degrees, a subset of one hundred eighty degrees or multiple segmented arcs for each of the light conduits 9, 11 is possible by coverings selectively blocking or attenuating the light 12, 13 emitted via the light redirection devices 1. The vertical emission pattern of the light 12, 13 is one hundred eighty degrees or multiple segmented arcs. The vertical emission pattern is largely controlled by the angle of the light redirection devices 1 surface to the light 14, 15 traveling in the light conduits 9, 11 and can be further modified by selectively blocking or attenuating the light via coverings. Said coverings comprise light opaque, light attenuating or combinations thereof materials. Examples of such materials are, aluminum, copper, steel, opaque or light attenuating plastics, opaque or light attenuating coatings, or combinations thereof. In the preferred embodiment, aluminum foil coverings are used.

In the preferred embodiment, the half-cone shaped light redirection devices 1 were chosen for their uniform light emission characteristic, however it is anticipated that other shapes for the redirection devices 1 could be utilized, depending on the desired light emission pattern.

In the preferred embodiment, the light emitted from the optical discontinuity of the light conduits 9, 11 is somewhat diffused by its nature. However, it may be desirable to have a more diffused light. To that end, the light conduits may have a light diffuser comprised of a roughened surface of the light conduit, an external diffused covering or combinations thereof.

The invention claimed is:

1. A bow light system for a boat comprising discrete port and starboard side light units, each said unit comprising:
    a base mounted to or within a boat structure or component, an integral socket recessed into the base, said recessed socket directly coupling to a proximal end portion of the removable light conduit and comprising a shape corresponding to the structural shape of the light conduit, said socket shape operable to orient the light conduit for the appropriate bow side light emission pattern, said direct coupling comprising a slip-fit of the recessed socket to said light conduit, an enclosing of a proximal portion of said light conduit and a socket recess depth into the base such that a minimal gap is formed between the socket proximal end and the light source;
    a connection to an electrical power source;
    a combination driver device and light source, said combination enclosed within the base but external to the recessed socket of the base, the light driver device operably connected to the electrical power source and comprising voltage conversion, low power dissipation and accurate control of light source current, the light source operably connected to the light driver and abutting the proximal end of the base recessed socket with a minimal gap, the light source operable to project light across said minimal gap and into the light conduit proximal end, when said light conduit is installed in the recessed base socket;
    a removable light conduit, said light conduit having the structure of a longitudinal section of a monolithic non-tapering solid rod, the rod material comprising transparency and a higher refractive index than the surrounding media, a proximal end portion directly coupling with the recessed socket of the base, the direct coupling comprising a slip-fit of the rod longitudinal section to the recessed socket of the base, a proximal portion for enclosure by said socket and a light coupling surface area, the light coupling surface area comprising the proximal end surface area of the rod longitudinal section, and a middle portion whose combination of structure and material make it operable to efficiently conduit and confine the conduit light to the distal end;
    and a mechanism to redirect and emit the light conducted within the light conduit out of the distal end in the desired emission pattern, said mechanism encompassed within the distal end structure, said structure a continuity of the non tapering rod longitudinal section of the light conduit, said mechanism a reflective surface near the distal end, said reflective surface having an angle-of-incidence to the conduit light operable to redirect and emit conduit light and a shape operable to emit light in the desired emission pattern from the distal end.

2. The light conduit construction of claim 1, wherein the light conduit incorporates a light barrier on a surface or surfaces not intended to be light emissive.

3. The bow light system described in claim 1, wherein the light conduit assembly has an outer covering over the middle portion of the light conduit, said outer covering having a refractive index operable to enhance the total internal reflection of the light conduit, said outer covering operable to protect the underlying light conduit from physical stress and damage.

4. The bow light system described in claim 1, wherein the light driver device to condition the incoming electrical power and drive the light source comprises a switching power supply topology based circuit.

5. The bow light system described in claim 1, wherein the light source comprises a Light Emitting Diode (LED), or LEDs.

6. The bow light system described in claim 1, wherein the reflective surface near the distal end of the light conduit comprises an optical discontinuity in the light conduit, said discontinuity comprising a boundary between the light conduit material and a medium with a index of refraction operable to cause a reflection at the boundary.

7. The reflective surface in claim 6, wherein the reflective surface comprises a partial cone shaped optical discontinuity near the distal end of the light conduit with a metallic discontinuity medium.

8. The bow light system described in claim 1, wherein the horizontal emission pattern of the light emerging from the distal end of the light conduit comprises one hundred eighty degrees, an angle less than one hundred eighty degrees, or multiple segmented arcs.

9. The horizontal light emission in claim 8, wherein the mechanism to form the horizontal light emission pattern comprises a light redirecting reflective surface and light opaque coverings and light attenuating coverings or combinations thereof.

10. The bow light system described in claim 1, wherein the vertical emission pattern of the light emerging from the distal end of the light conduits comprise an angle less than one hundred eighty degrees, or multiple segmented arcs.

11. The vertical light emission pattern described in claim 10, wherein the mechanism to form the vertical light emission pattern comprises the angle of incidence of the light traveling within the light conduit to the light redirecting reflective surface and light opaque coverings, light attenuating coverings or combinations thereof.

12. The bow light system described in claim 1, wherein the base material comprises aluminum, stainless steel, plastics, composites or combinations thereof.

13. The bow light system described in claim 1, wherein the light conduit material comprises acrylic, polycarbonate, glass or combinations thereof.

14. A bow light system for a boat, said system comprising a combination of port and starboard lights in one unit, said combination unit comprising:

a base mounted to or within a boat structure or component, an integral socket recessed into the base, said recessed socket directly coupling to a proximal end portion of the removable combination light conduit and incorporating an orientation mechanism with the removable combination light conduit, said direct coupling comprising a slip-fit of the recessed socket to said light conduit, an enclosing of a proximal portion of said light conduit and a socket recess depth into the base such that a minimal gap is formed between the socket proximal end and the light sources;

a connection to an electrical power source;

a combination driver device, port light source and starboard light source, said combination enclosed within the base but external to the recessed socket of the base, the light driver device operably connected to the electrical power source and comprising voltage conversion, low power dissipation and accurate current control for the light sources, the light sources operably connected to the light driver and abutting the proximal end of the base recessed socket with a minimal gap, the light sources operable to project light across said minimal gap and into the proximal ends of the corresponding port and starboard light conduits of the combination light conduit, when said combination light conduit is installed in the recessed base socket;

a removable combination port and starboard light conduit, said combination light conduit comprising distinct adjacent port and starboard light conduits and an orientation mechanism, said orientation mechanism in conjunction with the base orientation mechanism operable to align the port and starboard light conduits with the respective port and starboard light sources and orient the bow light emission patterns, the port and starboard light conduits each having the structure of a monolithic non-tapering longitudinal section of a solid rod, the rod material comprising transparency and a higher refractive index than the surrounding media, a proximal end portion directly coupling with the recessed socket of the base, the direct coupling comprising a slip-fit of the combination light conduit to the recessed socket of the base, a proximal portion for enclosure by said socket and light coupling surface areas, the light coupling surface areas comprising the proximal end surface area of the port and starboard rod longitudinal sections, and a middle portion whose combination of structure and material make it operable to efficiently conduit and confine the conduit light in each conduit to the respective distal ends;

and a mechanism in each light conduit to redirect and emit the light conducted within the respective light conduit rod longitudinal section, said mechanism encompassed within the distal end structure, said structure a continuity of the non tapering rod longitudinal section of the light conduit, said mechanism a reflective surface near the distal end, said reflective surface having an angle-of-incidence to the conduit light operable to redirect and emit conduit light and a shape operable to emit light in the desired emission pattern from the distal end.

15. The combination bow light system described in claim 14, wherein the light driver device to condition the incoming electrical power and drive the light sources is a switching power supply topology based circuit.

16. The combination bow light system described in claim 14, wherein the light sources each comprise a Light Emitting Diode (LED) or LEDs.

17. The combination light conduit construction of claim 14, wherein the combination light conduit incorporates a light barrier on a surface or surfaces not intended to be light emissive, including but not limited to, surfaces between adjacent light conduits.

18. The combination bow light system described in claim 14, wherein the light conduit material comprises acrylic, polycarbonate, glass or combinations thereof.

19. The combination bow light system described in claim 14, wherein the combination light conduits have an outer covering over the middle portion, said outer covering having a refractive index operable to enhance the total internal reflection of the light conduits, said outer covering operable to protect the underlying light conduits from physical stress and damage.

20. The combination bow light system described in claim 14, wherein the reflective surface near the distal end of each of the light conduits comprises an optical discontinuity in the light conduit, said discontinuity comprising a boundary between the light conduit material and a medium with an index of refraction operable to cause a reflection at the boundary.

21. The reflective surface in claim 20, wherein the reflective surface of each of the light conduits comprises a partial cone shaped optical discontinuity near the distal end with a metallic discontinuity medium.

22. The combination bow light system described in claim 14, wherein the horizontal emission pattern of the light emerging from the distal end of each of the light conduits comprises one hundred eighty degrees, an angle less than one hundred eighty degrees, or multiple segmented arcs.

23. The horizontal light emission in claim 22, wherein the mechanism to form the horizontal light emission pattern comprises a light redirecting reflective surface and light opaque coverings, light attenuating coverings or combinations thereof.

24. The combination bow light system described in claim 14, wherein the vertical emission pattern of the light emerging from the distal end of each of the light conduits comprise an angle less than one hundred eighty degrees, or multiple segmented arcs.

25. The vertical light emission pattern described in claim 24, wherein the mechanism to form the vertical light emission pattern of each of the light conduits comprises the angle of incidence of the light traveling within the light conduit to the surface of the optical discontinuity and light opaque coverings, light attenuating coverings or combinations thereof.

26. The bow light system described in claim 14, wherein the base material comprises aluminum, stainless steel, plastics, composites or combinations thereof.

27. The combination bow light system described in claim 14, wherein the orientation mechanism comprises a polarizing notch in the base socket and mating polarizing tab on the combination light conduit.

* * * * *